US012610336B2

(12) United States Patent
Keller et al.

(10) Patent No.: US 12,610,336 B2
(45) Date of Patent: Apr. 21, 2026

(54) REDIRECTION AND RETRY OF REGISTRATION

(71) Applicant: Telefonaktiebolaget LM Ericsson (publ), Stockholm (SE)

(72) Inventors: Ralf Keller, Würselen (DE); Peter Hedman, Helsingborg (SE); Angelo Centonza, Granada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 364 days.

(21) Appl. No.: 18/271,704

(22) PCT Filed: Jan. 14, 2022

(86) PCT No.: PCT/IB2022/050322
§ 371 (c)(1),
(2) Date: Jul. 11, 2023

(87) PCT Pub. No.: WO2022/153256
PCT Pub. Date: Jul. 21, 2022

(65) Prior Publication Data
US 2024/0080787 A1 Mar. 7, 2024

Related U.S. Application Data

(60) Provisional application No. 63/137,820, filed on Jan. 15, 2021.

(51) Int. Cl.
*H04W 8/04* (2009.01)
*H04W 8/26* (2009.01)
(Continued)

(52) U.S. Cl.
CPC .......... *H04W 60/00* (2013.01); *H04W 36/13* (2023.05); *H04W 36/08* (2013.01)

(58) Field of Classification Search
CPC ..... H04W 48/18; H04W 60/00; H04W 36/13; H04W 36/08; H04W 36/38
(Continued)

(56) References Cited

U.S. PATENT DOCUMENTS

2021/0037455 A1* 2/2021 Zhu ........................ H04W 76/27
2021/0136675 A1* 5/2021 Lee ........................ H04W 48/16

OTHER PUBLICATIONS

IP.com search history (Year: 2025).*
(Continued)

*Primary Examiner* — Moustapha Diaby
(74) *Attorney, Agent, or Firm* — Sonoda & Kobayashi Intellectual Property Law; Sarvajit S. Patil

(57) ABSTRACT

Redirection and retry of registration is disclosed herein. In some embodiments, a User Equipment (UE) of a Next Generation Radio Access Network (NG-RAN) is adapted to transmit a Non-Access Stratum (NAS) registration request comprising one or more Single-Network Slice Selection Assistance Information (S-NSSAI), indicated as one or more requested S-NSSAI. The UE is further adapted to receive, in an Access Stratum (AS) protocol, an AS-level registration reattempt indication to instruct the UE to reattempt the NAS registration request in a target cell. The UE is also adapted to reattempt the NAS registration in the target cell, responsive to receiving the AS-level registration reattempt indication.

7 Claims, 8 Drawing Sheets

(51) Int. Cl.
    *H04W 12/06*     (2021.01)
    *H04W 36/00*     (2009.01)
    *H04W 60/00*     (2009.01)
    *H04W 60/04*     (2009.01)
    *H04W 36/08*     (2009.01)
(58) Field of Classification Search
    USPC ....................................................... 455/435.1
    See application file for complete search history.

(56) References Cited

OTHER PUBLICATIONS

Author Unknown, "Technical Specification Group Services and System Aspects; Study on enhancement of network slicing; Phase 2 (Release 17)," Technical Report 23.700-40, Version 1.2.0, Nov. 2020, 3GPP Organizational Partners, 224 pages.

Author Unknown, "Technical Specification Group Services and System Aspects; Procedures for the 5G System; Stage 2 (Release 16)," Technical Specification 23.502, Version 16.0.0, Mar. 2019, 3GPP Organizational Partners, 420 pages.

Author Unknown, "Technical Specification Group Radio Access Network; NR; Radio Resource Control (RRC) protocol specification (Release 16)," Technical Specification 38.331, Version 16.3.1, Jan. 2021, 3GPP Organizational Partners, 932 pages.

CMCC, "R2-2010367: Discussion on SA2 LS and solutions for slice-based cell reselection," 3GPP TSG-RAN WG2 Meeting #112, Nov. 2-13, 2020, Electronic Meeting, 6 pages.

Samsung, et al., "C1-202150: Rejected NSSAI when sending clause #62 in Registration Reject message," 3GPP TSG-CT WG1 Meeting #123-e, Apr. 16-24, 2020, Electronic Meeting, 13 pages.

International Search Report and Written Opinion for International Patent Application No. PCT/IB2022/050322, mailed Apr. 8, 2022, 15 pages.

* cited by examiner

900

912

REDIRECTION AND RETRY OF REGISTRATION

RELATED APPLICATIONS

This application is a 35 U.S.C. § 371 national phase filing of International Application No. PCT/IB2022/050322, filed Jan. 14, 2022, which claims the benefit of provisional patent application Ser. No. 63/137,820, filed Jan. 15, 2021, the disclosures of which are hereby incorporated herein by reference in their entireties.

TECHNICAL FIELD

The present disclosure relates to registration of a User Equipment (UE) using Single-Network Slice Selection Assistance Information (S-NSSAI) in a cellular communication system.

BACKGROUND

Support for network slices in a registration area (RA) is homogenous in Third Generation Partnership Project (3GPP) Technical Report (TR) 23.700-40 Release 16. In 3GPP TR 23.700-40 Release 17, Solution #17 (and Solution #46, which mimics #17 but uses one or more rejected Single-Network Slice Selection Assistance Information (S-NSSAI) for redirection and also includes info to a User Equipment (UE) for cell reselection) enables the network to redirect the UE to a new tracking area (TA) when current TA does not support the S-NSSAI requested by the UE. The solution works in most cases, as it relies upon TA borders of S-NSSAI availability. An unsupported network slice is put in a Rejected S-NSSAI for the registration area (RA), and the UE then is assumed to retry per existing logic. In both Solutions #17 and #46, the registration accept occurs prior to the RwR (Release with Redirection, i.e., with cell reselection priorities), and then the UE attempts a new registration because the UE is in a new RA. Both solutions rely on the RwR succeeding, or, if done in CM-CONNECTED, that the handover (HO) succeeds.

Solution #17 avoids the need for the core network (CN) to know whether there actually is overlapping coverage or not. However, discussions in 3GPP are also focusing on whether the CN should have more information about Radio Access Network (RAN) coverage.

The Network Slice Selection Function (NSSF) can make use of the fact that a same Fifth Generation (5G) New Radio (NR) base station (gNB) reports support for "rejected S-NS-SAIs." A Next Generation Radio Access Network (NG-RAN) reports supported S-NSSAIs per TA during NG SETUP, and that information is propagated to the NSSF. There is a difference in that an Access and Mobility Management Function (AMF) can know per gNB basis about supported S-NSSAIs per TA, and then better assume if there is a high likelihood of overlap as the same gNB supports some S-NSSAIs. However, the NSSF only gets supported S-NSSAIs per TA, and not which gNB indicated it.

SUMMARY

Methods and apparatus are disclosed herein for providing redirection and retry of registration. Embodiments of a method performed by a User Equipment (UE) of a Next Generation Radio Access Network (NG-RAN) of a cellular communication system to enable redirection and retry of registration are disclosed herein. The method comprises transmitting a Non-Access Stratum (NAS) registration request comprising one or more Single-Network Slice Selection Assistance Information (S-NSSAI) indicated as one or more requested S-NSSAI. The method further comprises receiving, in an Access Stratum (AS) protocol, an AS-level registration reattempt indication to instruct the UE to reattempt the NAS registration request in a target cell. The method also comprises reattempting the NAS registration in the target cell, responsive to receiving the AS-level registration reattempt indication.

In some embodiments disclosed herein, the AS protocol comprises a Radio Resource Control (RRC) protocol. Some embodiments disclosed herein provide that the method further comprises receiving a Release with Redirection (RwR) or RRC reconfiguration to redirect the UE to the target cell. According to some embodiments disclosed herein, the method further comprises receiving, by the UE, a NAS registration accept message. In some embodiments disclosed herein, the AS-level registration reattempt indication includes at least one S-NSSAI of the one or more S-NSSAI that caused a redirection from an original serving cell.

Some embodiments disclosed herein provide that reattempting the NAS registration in the target cell comprises attempting to establish an AS connection in the target cell. In such examples, the method further comprises, responsive to successfully attempting to establish the AS connection in the target cell, determining, by the UE based on the AS-level registration reattempt indication, to request a NAS registration requesting the one or more S-NSSAI, and sending, to an access node, another NAS registration request containing the one or more S-NSSAI. According to some embodiments disclosed herein, reattempting the NAS registration in the target cell comprises attempting to establish an AS connection in the target cell. According to such examples, the method further comprises, responsive to unsuccessfully attempting to establish the AS connection in the target cell, determining, by the UE based on the AS-level registration reattempt indication, whether to reconnect to the original serving cell or to any cell in range with a same Tracking Area Identity (TAI) as the original serving cell.

Embodiments of a UE of a NG-RAN of a cellular communication system to enable redirection and retry of registration are also disclosed herein. In some embodiments disclosed herein, the UE comprises one or more transmitters, one or more receivers, and processing circuitry associated with the one or more transmitters and the one or more receivers. The processing circuitry is configured to cause the UE to transmit a NAS registration request comprising one or more S-NSSAI indicated as one or more requested S-NS-SAI. The processing circuitry is further configured to cause the UE to receive, in an AS protocol, an AS-level registration reattempt indication to instruct the UE to reattempt the NAS registration request in a target cell. The processing circuitry is also configured to cause the UE to reattempt the NAS registration in the target cell, responsive to receiving the AS-level registration reattempt indication. Some embodiments disclosed herein provide that the processing circuitry is additionally configured to cause the UE to perform the steps of any of the above-disclosed methods attributed to the UE.

Embodiments of a UE of a NG-RAN of a cellular communication system to enable redirection and retry of registration are also disclosed herein. According to some embodiments disclosed herein, the UE is adapted to transmit a NAS registration request comprising one or more S-NSSAI indicated as one or more requested S-NSSAI. The UE is further adapted to receive, in an AS protocol, an AS-level registration reattempt indication to instruct the UE to reattempt the NAS registration request in a target cell. The UE is also adapted to reattempt the NAS registration in the target cell, responsive to receiving the AS-level registration reattempt indication. In some embodiments disclosed herein, the UE is additionally adapted to perform the steps of any of the above-disclosed methods attributed to the UE.

Embodiments of a method performed in an access node of an NG-RAN of a cellular communication system to enable redirection and retry of a NAS registration. The method comprises determining that one or more of S-NSSAI requested by a UE in a NAS registration request cannot be served by an original serving cell or cannot be served at the NG-RAN. The method further comprises determining that the S-NSSAI requested by the UE in the NAS registration request can be served by a target cell in range. The method also comprises performing AS RwR or AS reconfiguration to redirect the UE to the target cell. The method additionally comprises transmitting, to the UE, an AS-level registration reattempt indication to instruct the UE to reattempt the NAS registration.

Some embodiments disclosed herein provide that the AS-level registration reattempt indication includes at least one of the one or more S-NSSAI causing redirection. According to some embodiments disclosed herein, the AS-level registration reattempt indication comprises the S-NSSAI causing redirection. In some embodiments disclosed herein, the AS-level registration reattempt indication comprises a list of S-NSSAIs that the UE can use in the target cell as requested Network Slice Selection Assistance Information (NSSAI). In some embodiments disclosed herein, the method further comprises receiving the one or more S-NSSAI from the UE in an RRC Setup Complete message or an RRC Resume Complete message. Some embodiments disclosed herein provide that the method further comprises receiving the one or more S-NSSAI causing redirection from an Access and Mobility Management Function (AMF).

Embodiments of an access node of a NG-RAN of a cellular communication system to enable redirection and retry of a NAS registration are also disclosed herein. According to some embodiments disclosed herein, the access node comprises at least one communication interface, and processing circuitry associated with the at least one communication interface. The processing circuitry is configured to cause the access node to determine that the S-NSSAI requested by the UE in the NAS registration request can be served by a target cell in range. The processing circuitry is further configured to cause the access node to determine that the S-NSSAI requested by the UE can be served by a target cell in range. The processing circuitry is also configured to cause the access node to perform AS RwR or AS reconfiguration to redirect the UE to the target cell. The processing circuitry is additionally configured to cause the access node to transmit, to the UE, an AS-level registration reattempt indication to instruct the UE to reattempt the NAS registration. In some embodiments disclosed herein, the processing circuitry is further configured to cause the access node to perform to perform the steps of any of the above-disclosed methods attributed to the access node.

Embodiments of an access node of a NG-RAN of a cellular communication system to enable redirection and retry of a NAS registration are also disclosed herein. Some embodiments disclosed herein provide that the access node is adapted to determine that one or more of S-NSSAI requested by a UE in a NAS registration request cannot be served by an original serving cell or cannot be served at the NG-RAN. The access node is further adapted to determine that the S-NSSAI requested by the UE in the NAS registration request can be served by a target cell in range. The access node is also adapted to perform AS RwR or AS reconfiguration to redirect the UE to the target cell. The access node is additionally adapted to transmit, to the UE, an AS-level registration reattempt indication to instruct the UE to reattempt the NAS registration. According to some embodiments disclosed herein, the access node is further adapted to perform to perform the steps of any of the above-disclosed methods attributed to the access node.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
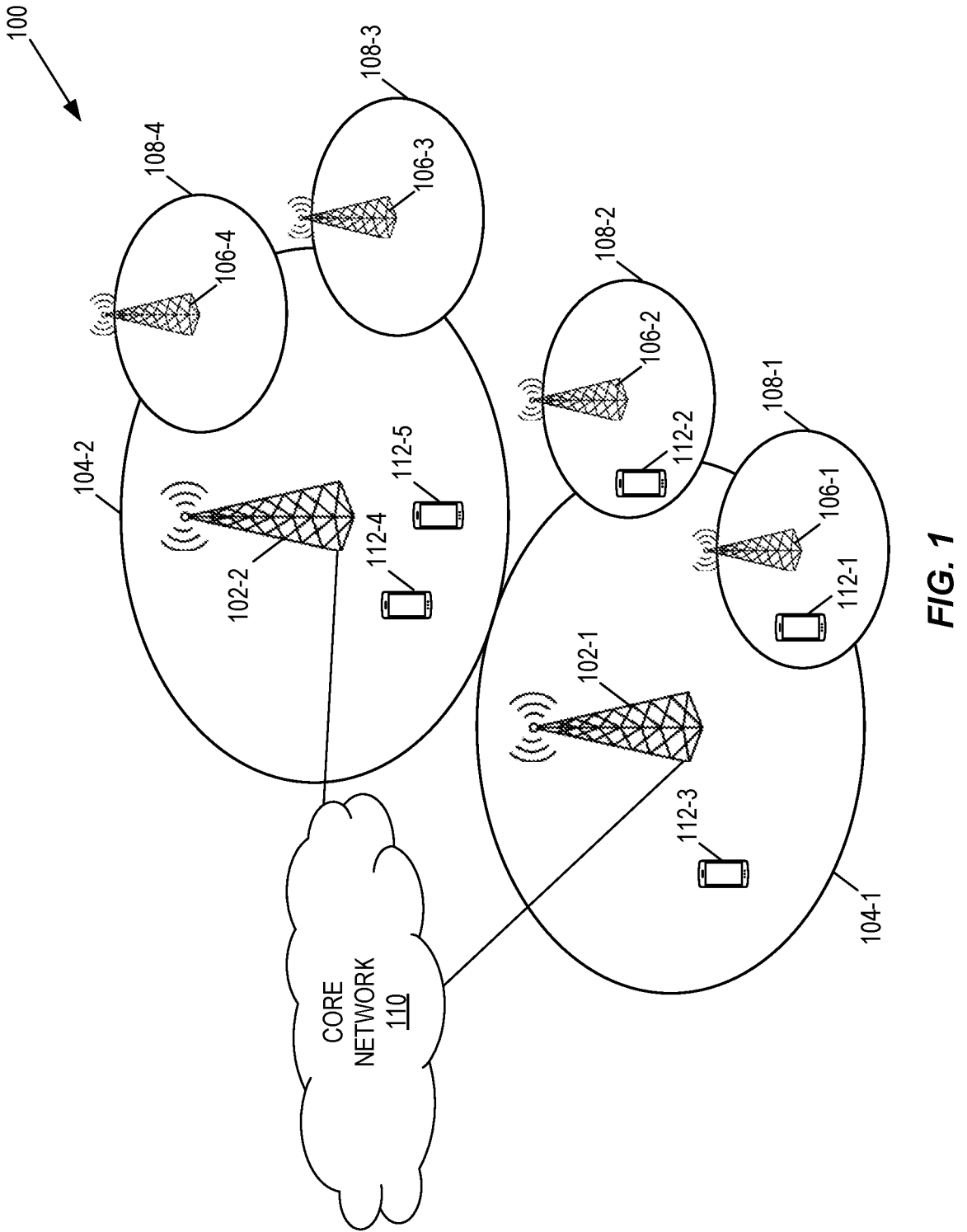
FIG. 1 illustrates one example of a cellular communications system according to some embodiments disclosed herein.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s). In particular, in some scenarios a User Equipment (UE) may register using one or more Single-Network Slice Selection Assistance Information (S-NSSAI) in Requested NSSAI, one of which is not supported on the currently used cell or band. If the registration is rejected and the New Radio (NR) Base Station (NR Node B or "gNB") redirects the UE to a new cell or band where the network slice is supported, however, it is unclear how to ensure that the UE performs registration with the rejected S-NSSAI when the Release with Redirection (RwR) or Handover (HO) succeeds, and what happens if the RwR or HO does not succeed. If the UE tries to add an S-NSSAI to Allowed NSSAI and is denied by an Access and Mobility Function (AMF), the S-NSSAI slice is added to Rejected NSSAI, and UE is only allowed to request it again if it enters a new Registration Area (RA).

If the slice is available at another co-located cell, the Radio Access Network (RAN) may use Solution #17 in 3GPP TR 23.700-40 to re-direct the UE to the other cell. This cell will have different slice support, and is therefore in another RA, so the RA is changed. This change, though, does not necessarily trigger the desired UE behavior.

There are, proposed herein, various embodiments which address one or more of the issues disclosed herein. One embodiment provides that, if the gNB detects that there is a not supported S-NSSAI in the Requested NSSAI (e.g., provided by the UE in Radio Resource Control (RRC) Setup Complete or RRC Resume Complete, or provided by the Core Network (CN) to the RAN via specific signaling after the UE performed a request for the S-NSSAI over Non-Access Stratum (NAS)), the gNB performs RwR or RRC reconfiguration (e.g., for handover) and sends a new indication to the UE (referred to herein as a "registration reattempt indication"), informing the UE that the redirection is for the purpose of allowing the UE to access the network slices as requested. The gNB indicates the S-NSSAI causing the redirection (i.e., the "redirect S-NSSAI"). If RwR succeeds, this new indication forces the UE to attempt registration in the new cell/band including all S-NSSAIs the UE may need to access (including the redirect S-NSSAI). If RwR fails, the UE stays on the current cell (i.e., the cell serving the UE before the RwR) or on a cell within the RA, and the UE removes the redirect S-NSSAI from Requested NSSAI and attempts registration again.

Another embodiment provides that, if the gNB detects that there are S-NSSAIs in the Rejected NSSAI (e.g., provided by the AMF to the RAN after the UE performed a request for the S-NSSAI over NAS) for which a redirect is possible, the gNB performs RwR or RRC reconfiguration (e.g., for Hand Over) and sends a new indication to the UE, informing the UE that the redirection is for the purpose of allowing the UE to access the rejected slice in the target cell of the RwR or HO. If the RwR or HO to new cell and TA succeeds, this new indication forces the UE to attempt registration in the new cell or band including the S-NSSAI(s) that was/were rejected for the previous RA. If the RwR or HO fails, the UE stays on current cell (i.e., the cell serving the UE before the RwR) or on a cell within the RA, knowing that it was forced to perform RwR due to S-NSSAI in requested NSSAI. The UE can then continue using the Allowed NSSAI without the rejected S-NSSAI.

Yet another embodiment operates the same as the previously described embodiment, but instead of a single indication, the Next Generation Radio Access Network (NG-RAN) provides a list of S-NSSAIs that the UE uses in the target cell (if redirection per RwR or HO succeeds) as Requested NSSAI. Namely, such list consists of a list of remapping S-NSSAIs that can be used instead of the requested S-NSSAI for establishment of the PDU Session resources needed for the UE.

Embodiments disclosed herein thus provide one or more of the following technical advantage(s). The point of signaling to the UE is that the RwR is for the purpose of connecting to the S-NSSAI(s) requested, but not possible to serve at the serving gNB. By sending the Target NSSAI indication, the UE knows that it needs to request for those slices again after redirection, and if redirection fails, the UE needs to connect back to the old cell for connection to any slice that was in use (or in the allowed NSSAI) before the RwR. The additional information proposed by solution #46 in TR23.700-40 implies the addition of much more information which makes the RRC message much larger (noting that UE could use the Frequency band per S-NSSAI information proposed by solution #46 to derive that the UE should request the same S-NSSAI again at the target RA).

Before discussing methods and apparatus for providing redirection and retry of registration in greater detail, exemplary cellular communications systems in which some embodiments of the present disclosure may be implemented are first discussed. In this regard, the following terms are defined:

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1 illustrates one example of a cellular communications system 100 in which embodiments of the present disclosure may be implemented. In the embodiments described herein, the cellular communications system 100 is a 5G system (5GS) including a NG-RAN and a 5G Core (5GC) or an Evolved Packet System (EPS) including an Evolved Universal Terrestrial RAN (E-UTRAN) and an Evolved Packet Core (EPC). In this example, the RAN includes base stations 102-1 and 102-2, which in the 5GS include gNBs and optionally next generation eNBs (ng-eNBs) (e.g., LTE RAN nodes connected to the 5GC) and in the EPS include eNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
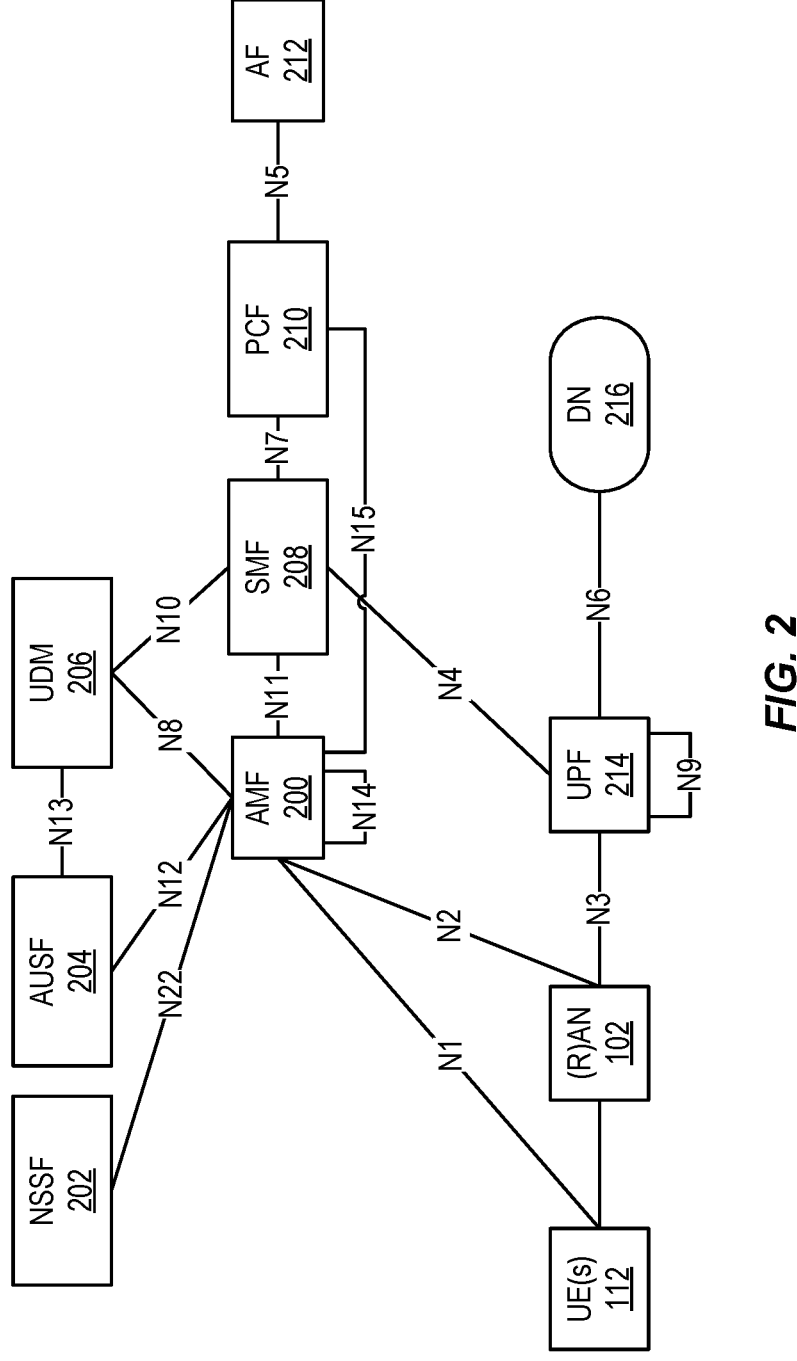
FIGS. 2 and 3 illustrate example embodiments in which the cellular communication system of FIG. 3 is a Fifth Generation (5G) System (5GS)

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g., such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating UP and CP. The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and a Data Network (DN) 216 (which provides Internet access, operator services, and/or the like) for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
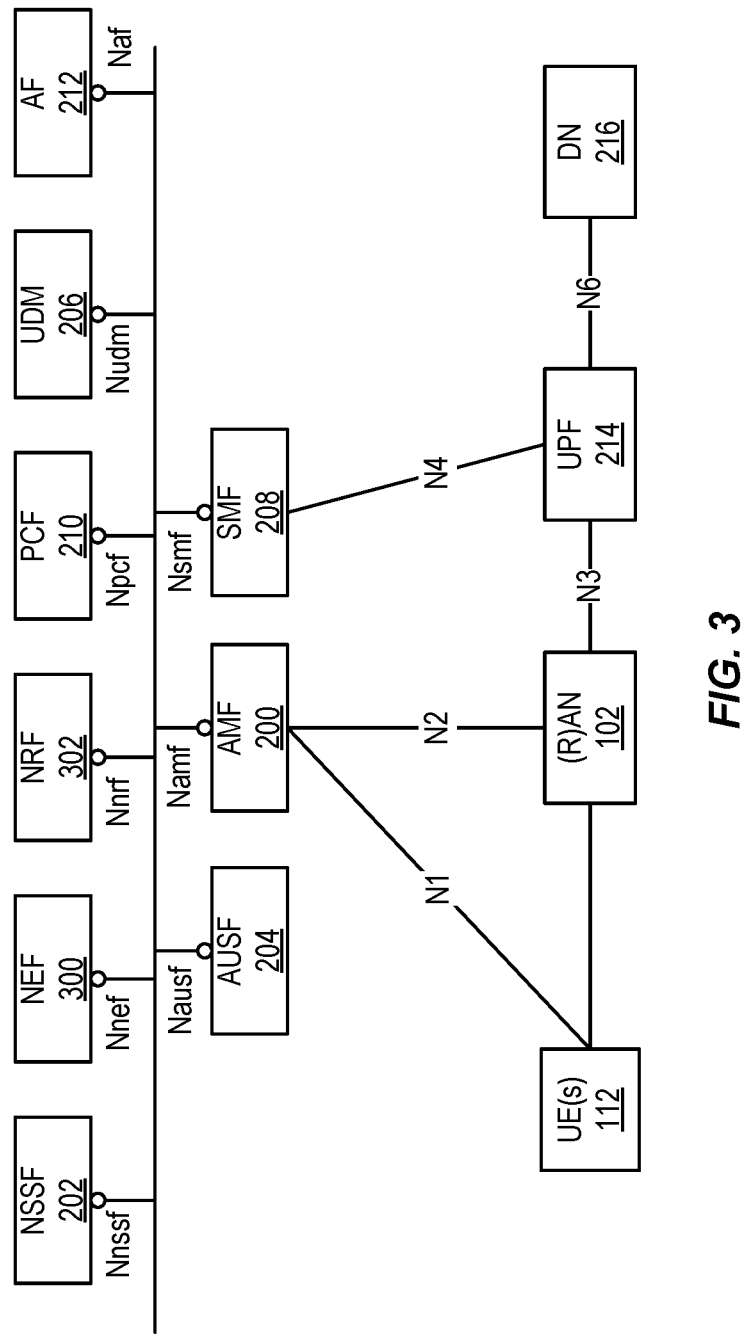

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g., Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN) 216, not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Aspects of some embodiments will now be discussed. For the sake of illustration, FIG. 4 reproduces FIG. 6.17.3-1 of 3GPP TR 23.700 v.1.2.0, with the addition of the "Target NSSAI Indication" included in step 414. The description of FIG. 6.17.3-1 of 3GPP TR 23.700 v.1.2.0 applies except as otherwise described herein.

Figure 4:
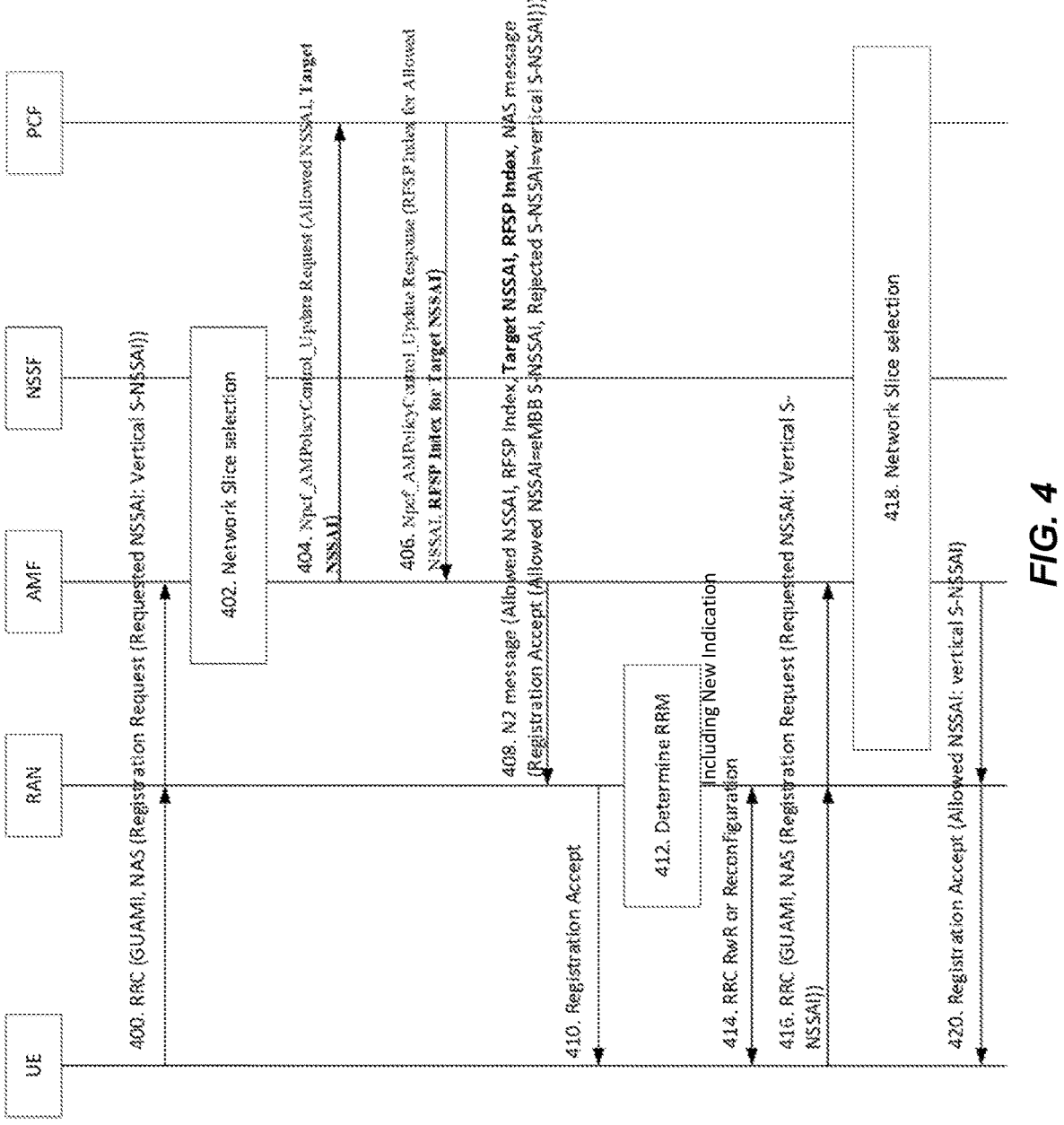
FIG. 4 illustrates exemplary communication flows and operations for as provided in FIG. 6.17.3-1 of 3GPP TR 23.700 v.1.2.0, with the addition of a Target NSSAI Indication according to some embodiments disclosed herein.

In one embodiment, the UE at step 400 of FIG. 4 may, per existing specifications, include an s-NSSAI-List in the RRC-SetupComplete (see 3GPP TR 38.331). Note, whether the UE includes the s-NSSAI-List is dependent on the Access Stratum Connection Establishment NSSAI Inclusion Mode (see clause 5.15.9 of 3GPP TS 23.501). When the NG-RAN receives an s-NSSAI-List, the NG-RAN checks that the S-NSSAIs are allowed to be served by the current cell, and if not, the NG-RAN determines whether the S-NSSAIs could be served by a different cell in range. If so, the NG-RAN initiates step 414 (i.e., triggers an RwR), with the intention of allowing the UE to connect to the target cell that could serve the S-NSSAIs in the s-NSSAI-List. In this case, the new indication tells the UE to re-send the s-NSSAI-List again at the target cell.

In another embodiment, in step 408 of FIG. 4, it can be seen that the AMF signals to the RAN the Target NSSAI, which includes the S-NSSAI that the UE requested at the serving RAN and that could not be served at serving RAN. At reception of the Target NSSAI, the serving RAN is able to determine whether the Target NSSAI could be served by a different cell in range. The serving RAN thus triggers a RwR as in step 414 of FIG. 4, with the intention of allowing the UE to connect to the target cell that could serve the Target NSSAI.

When the UE has been redirected and successfully establishes an RRC connection with the redirection target cell, the UE sends a Requested NSSAI as in step 416 of FIG. 4. The UE uses the new indication received in the RwR of step 414 of FIG. 4 to determine whether to re-send, in step 416 of FIG. 4, the S-NSSAI that was rejected for the RA in step 410 of FIG. 4.

Alternatively, if the redirection of the UE is unsuccessful (i.e., the UE was not able to access the redirection target cell), then the UE uses the new indication received in the RwR of step 414 of FIG. 4 to determine that the redirection was for the purpose of letting the UE request the slice rejected in the source cell. With this information at hand, the UE is able to determine whether it should re-connect to the original serving cell or to any cell in range with the same TAI as the original serving cell, in order to access the slices in the Allowed NSSAI provided when in the source cell.

In another embodiment, and with respect to FIG. 4, the procedures after step 412 may be modified as described below:

Step 414: The serving RAN decides to hand over the UE to another target cell in range that can serve the S-NSSAI(s) that were rejected for the UE at the registration in step 400 of FIG. 4. As part of the HO command signaled to the UE to trigger mobility towards the selected target cell, the serving RAN includes the TargetNSSAI indication, which is received by the UE before handover execution.

Step 416: The UE successfully executes the HO to the target cell. The UE uses the TargetNSSAI indication received in the HO Command in step 414 of FIG. 4 to determine whether to re-send in the new registration triggered at step 416 of FIG. 4 (as part of the RRC access to the target cell) the S-NSSAI that was rejected for the RA in step 410 of FIG. 4.

Alternatively, if the handover execution was unsuccessful (i.e., the UE was not able to access the target cell), then the UE uses the new indication received in the HO Command in step 414 of FIG. 4 to determine that the handover was for the purpose of letting the UE request the slice rejected in the source cell. With this information at hand, the UE is able to determine that it should re-connect to the original serving cell or to any cell in range with the same TAI as the original serving cell, in order to access the slices in the Allowed NSSAI provided when in the source cell.

Tables 1~4 below illustrate an implementation of an indication of S-NSSAI to be accessed after RwR, according to some embodiments. This implementation is based on the RRCRelease message specified in 3GPP TR 38.331 v16.0.0 which is used as reference, with the addition of the newly added TargetNSSAI:

TABLE 1

| 5.1.1.1-RRCRelease |
|---|

The RRCRelease message is used to command the release of an RRC connection or the suspension of
the RRC connection.

Signaling radio bearer: SRB1
    RLC-SAP: AM
    Logical channel: DCCH
    Direction: Network to UE

```
                                        RRCRelease message
-- ASN1START
-- TAG-RRCRELEASE-START
RRCRelease ::=                  SEQUENCE {
    rrc-TransactionIdentifier       RRC-TransactionIdentifier,
    criticalExtensions              CHOICE {
        rrcRelease                      RRCRelease-IEs,
        criticalExtensionsFuture        SEQUENCE { }
    }
}
RRCRelease-IEs ::=              SEQUENCE {
    redirectedCarrier Info          RedirectedCarrier Info
OPTIONAL, -- Need N
    cellReselectionPriorities       CellReselectionPriorities
OPTIONAL, -- Need R
    suspendConfig                   SuspendConfig
OPTIONAL, -- Need R
    deprioritisationReq             SEQUENCE {
        deprioritisationType            ENUMERATED {frequency, nr},
        deprioritisationTimer           ENUMERATED {min5, min10, min15, min30}
    }
OPTIONAL, -- Need N
    lateNonCriticalExtension        OCTET STRING
OPTIONAL,
    nonCriticalExtension            RRCRelease-v1540-IEs
OPTIONAL
}
RRCRelease-v1540-IEs ::=        SEQUENCE {
    waitTime                        RejectWaitTime          OPTIONAL, -- Need N
    nonCriticalExtension            RRCRelease-v16xy-IEs    OPTIONAL
}
RRCRelease-v16xy-IEs ::=        SEQUENCE {
    voiceFallback Indication-r16    ENUMERATED { true}                  OPTIONAL,
-- Need N
    measIdleConfig-r16              SetupRelease { Meas IdleConfigDedicated-r16} OPTIONAL,
-- Need M
    nonCriticalExtension            SEQUENCE { }                        OPTIONAL
}
RedirectedCarrierInfo ::=       CHOICE {
    nr                              Carrier InfoNR,
    eutra                           RedirectedCarrier Info-EUTRA,
    . . .
}
RedirectedCarrier Info-EUTRA ::=    SEQUENCE {
    eutraFrequency                  ARFCN-ValueEUTRA,
    cnType                          ENUMERATED {epc, fiveGC}
OPTIONAL      -- Need N
}
Carrier InfoNR ::=              SEQUENCE {
    carrierFreq                     ARFCN-ValueNR,
    ssbSubcarrierSpacing            SubcarrierSpacing,
    smtc                            SSB-MTC
OPTIONAL,      -- Need S
    . . .
}
SuspendConfig ::=              SEQUENCE {
    fullI-RNTI                      I-RNTI-Value,
    shortI-RNTI                     ShortI-RNTI-Value,
    ran-PagingCycle                 PagingCycle,
    ran-NotificationAreaInfo        RAN-NotificationAreaInfo
OPTIONAL,      -- Need M
    t380                            PeriodicRNAU-TimerValue
OPTIONAL,    -- Need R
    nextHopChainingCount            NextHopChainingCount,
    . . .
}
PeriodicRNAU-TimerValue ::=     ENUMERATED { min5, min10, min20, min30, min60, min120,
min360, min 720}
CellReselectionPriorities ::=   SEQUENCE {
    freqPriorityListEUTRA           FreqPriorityListEUTRA
OPTIONAL,      -- Need M
```

TABLE 1-continued

| 5.1.1.1-RRCRelease | |
|---|---|
| freqPriorityListNR OPTIONAL,    -- Need M | FreqPriorityListNR |
| t320 min180, spare1} OPTIONAL, | ENUMERATED {min5, min10, min20, min30, min60, min120, -- Need R |
| . . . } | |
| PagingCycle ::= | ENUMERATED {rf32, rf64, rf128, rf256 } |
| FreqPriorityListEUTRA ::= | SEQUENCE (SIZE (1. . maxFreq)) OF FreqPriorityEUTRA |
| FreqPriorityListNR ::= | SEQUENCE (SIZE (1. . maxFreq)) OF FreqPriorityNR |
| FreqPriorityEUTRA ::= | SEQUENCE { |
| carrierFreq | ARFCN-ValueEUTRA, |
| cellReselectionPriority | CellReselectionPriority, |
| cellReselectionSubPriority OPTIONAL        -- Need R | CellReselectionSubPriority |
| } | |
| FreqPriorityNR ::= | SEQUENCE { |
| carrierFreq | ARFCN-ValueNR, |
| cellReselectionPriority | CellReselectionPriority, |
| cellReselectionSubPriority OPTIONAL        -- Need R | CellReselectionSubPriority |
| } | |
| RAN-NotificationAreaInfo ::= | CHOICE { |
| cellList | PLMN-RAN-AreaCellList, |
| ran-AreaConfigList | PLMN-RAN-AreaConfigList, |
| . . . | |
| } | |
| PLMN-RAN-AreaCellList ::= AreaCell | SEQUENCE (SIZE (1. . maxPLMNIdentities)) OF PLMN-RAN- |
| PLMN-RAN-AreaCell ::= | SEQUENCE { |
| plmn-Identity OPTIONAL, -- Need S | PLMN-Identity |
| ran-AreaCells | SEQUENCE (SIZE (1 .. 32)) OF CellIdentity |
| } | |
| PLMN-RAN-AreaConfigList ::= AreaConfig | SEQUENCE (SIZE (1. . maxPLMNIdentities)) OF PLMN-RAN- |
| PLMN-RAN-AreaConfig ::= | SEQUENCE { |
| plmn-Identity OPTIONAL, -- Need S | PLMN-Identity |
| ran-Area | SEQUENCE (SIZE (1 .. 16)) OF RAN-AreaConfig |
| } | |
| RAN-AreaConfig ::= | SEQUENCE { |
| trackingAreaCode | TrackingAreaCode, |
| ran-AreaCodeList Need R | SEQUENCE (SIZE (1 .. 32)) OF RAN-AreaCode OPTIONAL      -- |
| } | |
| TargetNSSAI ::= | SEQUENCE { |
| s-NSSAI-List | SEQUENCE (SIZE (1 . .maxNrofS-NSSAI)) OF S-NSSAI, |
| . . . | |
| } | |
| -- TAG-RRCRELEASE-STOP | |
| -- ASN1STOP | |

TABLE 2

| RRCRelease-IEs field descriptions |
|---|
| cnType |
| Indicate that the UE is redirected to EPC or 5GC. |
| deprioritisationReq |
| Indicates whether the current frequency or RAT is to be de-prioritised. |
| deprioritisationTimer |
| Indicates the period for which either the current carrier frequency or |
| NR is deprioritised. Value minN corresponds to N minutes. |
| measIdleConfig |
| Indicates measurement configuration to be stored and used by the UE |
| while in RRC_IDLE or RRC_INACTIVE. |
| suspendConfig |
| Indicates configuration for the RRC_INACTIVE state. The network |
| does not configure suspendConfig when the network |
| redirect the UE to an inter-RAT carrier frequency. |
| redirectedCarrierInfo |
| Indicates a carrier frequency (downlink for FDD) and is used to |
| redirect the UE to an NR or an inter-RAT carrier frequency, |
| by means of cell selection at transition to RRC_IDLE or |
| RRC_INACTIVE as specified in TS 38.304 [20]. In this release of |

TABLE 2-continued

| RRCRelease-IEs field descriptions |
|---|
| specification, redirectedCarrierInfo is not included in an |
| RRCRelease message with suspendConfig if this message is in |
| response to an RRCResumeRequest or an RRCResumeRequest1 |
| which is triggered by the NAS layer. |
| voiceFallbackIndication |
| Indicates the RRC release is triggered by EPS fallback for IMS voice |
| as specified in TS 23.502 [43]. |
| TargetNSSAI |
| Indicates the S-NSSAIs the UE should attempt to access after |
| successful release with redirection |

TABLE 3

CarrierInfoNR field descriptions carrierFreq
Indicates the redirected NR frequency.
ssbSubcarrierSpacing
Subcarrier spacing of SSB in the redirected SSB frequency. Only the
values 15 kHz or 30 kHz (FR1), and 120 KHz or 240 kHz
(FR2) are applicable.
smtc
The SSB periodicity/offset/duration configuration for the redirected
SSB frequency. It is based on timing reference of PCell. If the field is
absent, the UE uses the SMTC configured in the measObjectNR
having the same SSB frequency and subcarrier spacing.

TABLE 4

RAN-NotificationArea Info field descriptions cellList
A list of cells configured as RAN area.
ran-AreaConfigList
A list of RAN area codes or RA code(s) as RAN area.

It is noted that information elements (IEs) similar to the ones provided above as part of the RRCRelease message could be used for the Target NSSAI indication (namely in cases where the RAN performs mobility of the UE to a target cell in order to let it access the requested s-NSSAI). In such a case, the IEs proposed in the example above may be added as part of the HandoverCommand or RRCReconfiguration message.

Tables 5-8 below illustrate another implementation of an indication of RwR to access a Rejected S-NSSAI according to some embodiments.

One possible way to implement the method based on release and redirection described above is shown below. In this embodiment, the RRCRelease message specified in 3GPP TR 38.331 v16.0.0 is used as reference with a new flag added to indicate to the UE that the RwR is for the purpose of accessing the S-NSSAI(s) that was rejected in the source RAN. Note that some embodiments may provide that the new flag indicates that the RwR was due to an S-NSSAI not allowed in a current cell, and an additional list of S-NSSAIs may optionally be included as additional data.

TABLE 5

5.1.1.1-RRCRelease

The RRCRelease message is used to command the release of an RRC connection or the suspension of
the RRC connection.
    Signaling radio bearer: SRB1
    RLC-SAP: AM
    Logical channel: DCCH
    Direction: Network to UE

```
                                          RRCRelease message

-- ASN1START
-- TAG-RRCRELEASE-START
RRCRelease ::=                        SEQUENCE {
      rrc-TransactionIdentifier          RRC-TransactionIdentifier,
      criticalExtensions                 CHOICE {
         rrcRelease                        RRCRelease-IEs,
         criticalExtensionsFuture          SEQUENCE { }
      }
}
RRCRelease-IEs ::=                    SEQUENCE {
      redirectedCarrierInfo              RedirectedCarrier Info
OPTIONAL,      -- Need N
      cellReselectionPriorities          CellReselectionPriorities
OPTIONAL,      -- Need R
      suspendConfig                      SuspendConfig
OPTIONAL,      -- Need R
      deprioritisationReq                SEQUENCE {
         deprioritisationType               ENUMERATED { frequency, nr},
         deprioritisationTimer              ENUMERATED {min5, min10, min15, min30}
      }
OPTIONAL,      -- Need N
      lateNonCriticalExtension           OCTET STRING
OPTIONAL,
      nonCriticalExtension               RRCRelease-v1540-IEs
OPTIONAL
}
RRCRelease-v1540-IEs ::=              SEQUENCE {
      waitTime                           RejectWaitTime              OPTIONAL, -- Need N
      nonCriticalExtension               RRCRelease-v16xy-IEs        OPTIONAL
}
RRCRelease-v16xy-IEs ::=              SEQUENCE {
      voiceFallback Indication-r16       ENUMERATED {true}                       OPTIONAL,
-- Need N
      measIdleConfig-r16                 SetupRelease       {MeasIdleConfigDedicated-r16} OPTIONAL,
-- Need M
      nonCriticalExtension               SEQUENCE { }                            OPTIONAL
}
RedirectedCarrier Info ::=            CHOICE {
      nr                                 Carrier InfoNR,
      eutra                              RedirectedCarrier Info-EUTRA,
      . . .
```

TABLE 5-continued

| 5.1.1.1-RRCRelease |
|---|

```
}
RedirectedCarrier Info-EUTRA ::=          SEQUENCE {
    eutraFrequency                            ARFCN-ValueEUTRA,
    cnType                                    ENUMERATED {epc, fiveGC}
OPTIONAL          -- Need N
}
CarrierInfoNR ::=                         SEQUENCE {
    carrierFreq                               ARFCN-ValueNR,
    ssbSubcarrierSpacing                      SubcarrierSpacing,
    smtc                                      SSB-MTC
OPTIONAL,          -- Need S
    . . .
}
SuspendConfig ::=                         SEQUENCE {
    fullI-RNTI                                I-RNTI-Value,
    shortI-RNTI                               ShortI-RNTI-Value,
    ran-PagingCycle                           PagingCycle,
    ran-NotificationAreaInfo                  RAN-NotificationAreaInfo
OPTIONAL,      -- Need M
    t380                                      PeriodicRNAU-TimerValue
OPTIONAL,      -- Need R
    nextHopChainingCount                      NextHopChainingCount,
    . . .
}
PeriodicRNAU-TimerValue ::=               ENUMERATED { min5, min10, min20, min30, min60, min120,
min360, min 720}
CellReselectionPriorities ::=             SEQUENCE {
    freqPriorityListEUTRA                     FreqPriorityListEUTRA
OPTIONAL, -- Need M
    freqPriorityListNR                        FreqPriorityListNR
OPTIONAL, -- Need M
    t320                                      ENUMERATED {min5, min10, min20, min30, min60, min120,
min180, spare1} OPTIONAL,       -- Need R
    . . .
}
PagingCycle ::=                           ENUMERATED {rf32, rf64, rf128, rf256}
FreqPriorityListEUTRA ::=                 SEQUENCE (SIZE (1. .maxFreq)) OF FreqPriorityEUTRA
FreqPriorityListNR ::=                    SEQUENCE (SIZE (1. .maxFreq)) OF FreqPriorityNR
FreqPriorityEUTRA ::=                     SEQUENCE {
    carrierFreq                               ARFCN-ValueEUTRA,
    cellReselectionPriority                   CellReselectionPriority,
    cellReselectionSubPriority                CellReselectionSubPriority
OPTIONAL -- Need R
}
FreqPriorityNR ::=                        SEQUENCE {
    carrierFreq                               ARFCN-ValueNR,
    cellReselectionPriority                   CellReselectionPriority,
    cellReselectionSubPriority                CellReselectionSubPriority
OPTIONAL -- Need R
}
RAN-NotificationAreaInfo ::=              CHOICE {
    cellList                                  PLMN-RAN-AreaCellList,
    ran-AreaConfigList                        PLMN-RAN-AreaConfigList,
    . . .
}
PLMN-RAN-AreaCellList ::=                 SEQUENCE (SIZE (1. . maxPLMNIdentities)) OF PLMN-RAN-
AreaCell
PLMN-RAN-AreaCell ::=                     SEQUENCE {
    plmn-Identity                             PLMN-Identity
OPTIONAL, -- Need S
    ran-AreaCells                             SEQUENCE (SIZE (1. .32)) OF CellIdentity
}
PLMN-RAN-AreaConfigList ::=               SEQUENCE (SIZE (1. .maxPLMNIdentities)) OF PLMN-RAN-
AreaConfig
PLMN-RAN-AreaConfig ::=                   SEQUENCE {
    plmn-Identity                             PLMN-Identity
OPTIONAL, -- Need S
    ran-Area                                  SEQUENCE (SIZE (1 .. 16)) OF RAN-AreaConfig
}
RAN-AreaConfig ::=                        SEQUENCE {
    trackingAreaCode                      TrackingAreaCode,
    ran-AreaCodeList                      SEQUENCE (SIZE (1. .32)) OF RAN-AreaCode          OPTIONAL
                                          --
Need R
}
Rejected-sNSSAI-Access ::=                    SEQUENCE {
    sNSSAI-Access ::=                     ENUMERATED { Rejected-sNSSAI}
        s-NSSAI-List                          SEQUENCE (SIZE (1. .maxNrofS-NSSAI)) OF S-NSSAI
```

TABLE 5-continued 5.1.1.1-RRCRelease

OPTIONAL,
    . . .
}
-- TAG-RRCRELEASE-STOP
-- ASN1 STOP

TABLE 6

RRCRelease-IEs field descriptions cnType
Indicate that the UE is redirected to EPC or 5GC.
deprioritisationReq
Indicates whether the current frequency or RAT is to be de-prioritised.
deprioritisation Timer
Indicates the period for which either the current carrier frequency or
NR is deprioritised. Value min/ corresponds to N minutes.
measIdleConfig
Indicates measurement configuration to be stored and used by the
UE while in RRC_IDLE or RRC_INACTIVE.
suspendConfig
Indicates configuration for the RRC_INACTIVE state. The network
does not configure suspendConfig when the network redirect the UE
to an inter-RAT carrier frequency.
redirectedCarrierInfo
Indicates a carrier frequency (downlink for FDD) and is used to redirect
the UE to an NR or an inter-RAT carrier frequency, by means of cell
selection at transition to RRC_IDLE or RRC_INACTIVE as specified in
TS 38.304 [20]. In this release of specification, redirectedCarrierInfo is
not included in an RRCRelease message with suspendConfig if this
message is in response to an RRCResumeRequest or an
RRCResumeRequest1 which is triggered by the NAS layer.
voiceFallbackIndication
Indicates the RRC release is triggered by EPS fallback for IMS voice as
specified in TS 23.502 [43].
Rejected-sNSSAI-Access
This IE includes the sNSSAI-Access that indicates that the UE shall
attempt access to the rejected sNSSAI after release and redirection
The IE also includes the s-NSSAI list, which is optionally present and
that consists of a list of s-NSSAI the UE shall attempt to access after
release with redirection

TABLE 7

CarrierInfoNR field descriptions carrierFreq
Indicates the redirected NR frequency.
ssbSubcarrierSpacing
Subcarrier spacing of SSB in the redirected SSB frequency. Only the val-
ues
15 kHz or 30 KHz (FR1), and 120 kHz or 240 KHz (FR2) are applicable.
smtc
The SSB periodicity/offset/duration configuration for the redirected SSB
frequency. It is based on timing reference of PCell. If the field is absent,
the UE uses the SMTC configured in the measObjectNR having the same
SSB frequency and subcarrier spacing.

TABLE 8

RAN-NotificationArea Info field descriptions cellList
A list of cells configured as RAN area.
ran-AreaConfigList
A list of RAN area codes or RA code(s) as RAN area.

Figure 5:
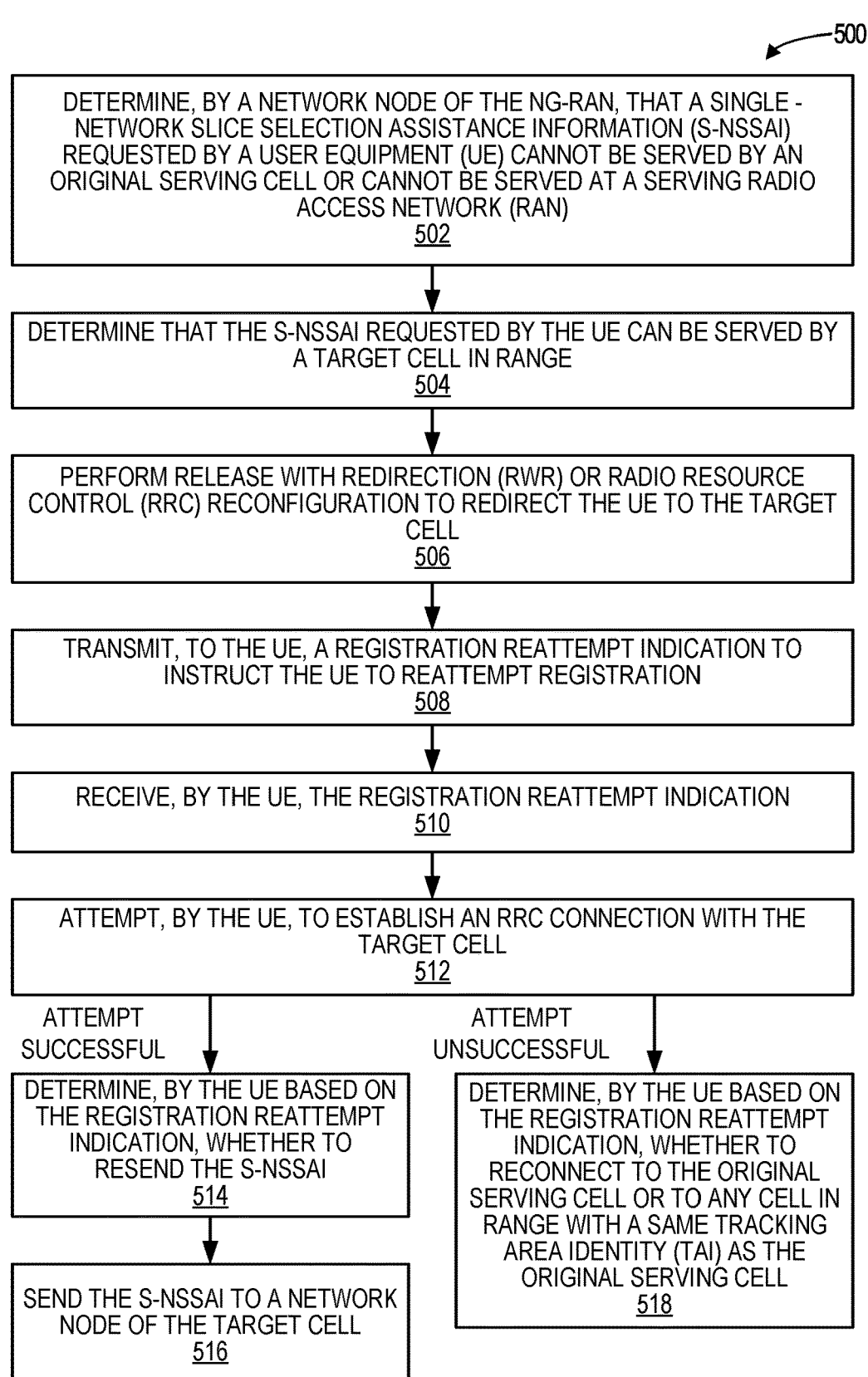
FIG. 5 illustrates exemplary operations for providing redirection and retry of registration, according to some embodiments disclosed herein.

FIG. 5 provides a flowchart 500 that illustrates exemplary operations performed by a network node, such as a base station 102 or 106, for providing redirection and retry of registration. In FIG. 5, operations begin with a network node determining that an S-NSSAI requested by a UE cannot be served by an original serving cell or cannot be served at a serving RAN (block 502). The network node determines that the S-NSSAI can be served by a target cell in range (block 504). The network node then performs RwR or RRC recon-figuration to redirect the UE to the target cell (block 506). The network node then transmits, to the UE, a registration reattempt indication to instruct the UE to reattempt registration including the S-NSSAI causing the redirection (block 508).

In some examples, the UE receives the registration reattempt indication (block 510). The UE then attempts to establish an RRC connection with the target cell (block 512). If the attempt is successful, the UE determines, based on the registration reattempt indication, whether to resend the S-NSSAI (block 514). The UE then sends the S-NSSAI to a network node of the target cell (block 516). For example, the UE may send the S-NSSAI as a list of S-NSSAIs in NAS as a requested NSSAI, and optionally in RRC message 5. However, if the attempt is unsuccessful, the UE determines, based on the registration reattempt indication, whether to reconnect to the original serving cell or to any cell in range with a same TAI as the original serving cell (block 518).

Figure 6:
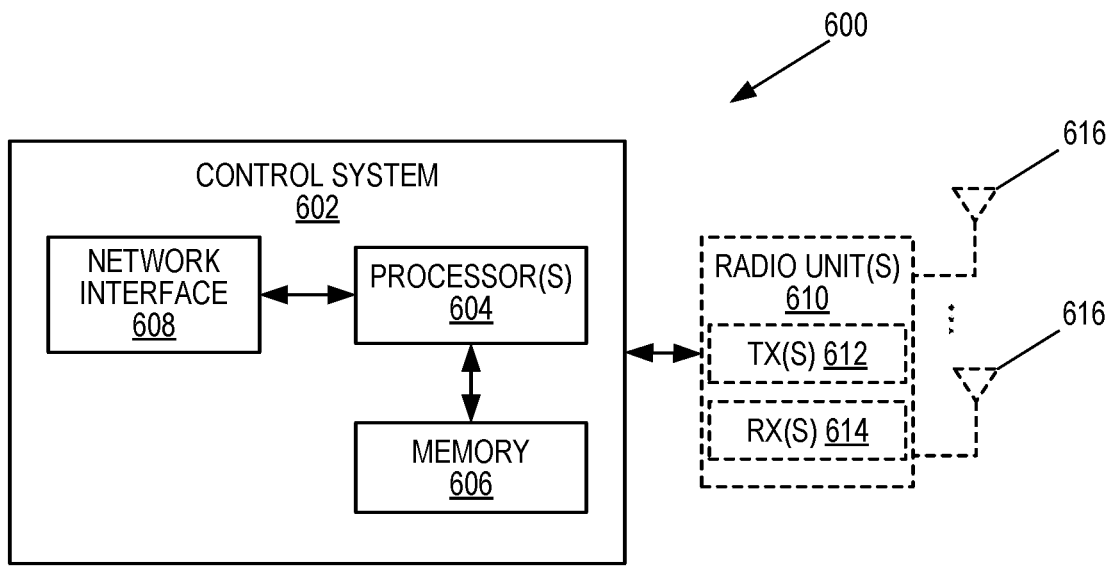
FIG. 6 is a schematic block diagram of a radio access node according to some embodiments disclosed herein.

FIG. 6 is a schematic block diagram of a radio access node 600 according to some embodiments of the present disclosure. Optional features are represented by dashed boxes. The radio access node 600 may be, for example, a base station 102 or 106 or a network node that implements all or part of the functionality of the base station 102 or gNB described herein. As illustrated, the radio access node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. In addition, the radio access node 600 may include one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a radio access node 600 as described herein. In some embodiments, the function(s) are implemented in software that is stored, e.g., in the memory 606 and executed by the one or more processors 604.

Figure 7:
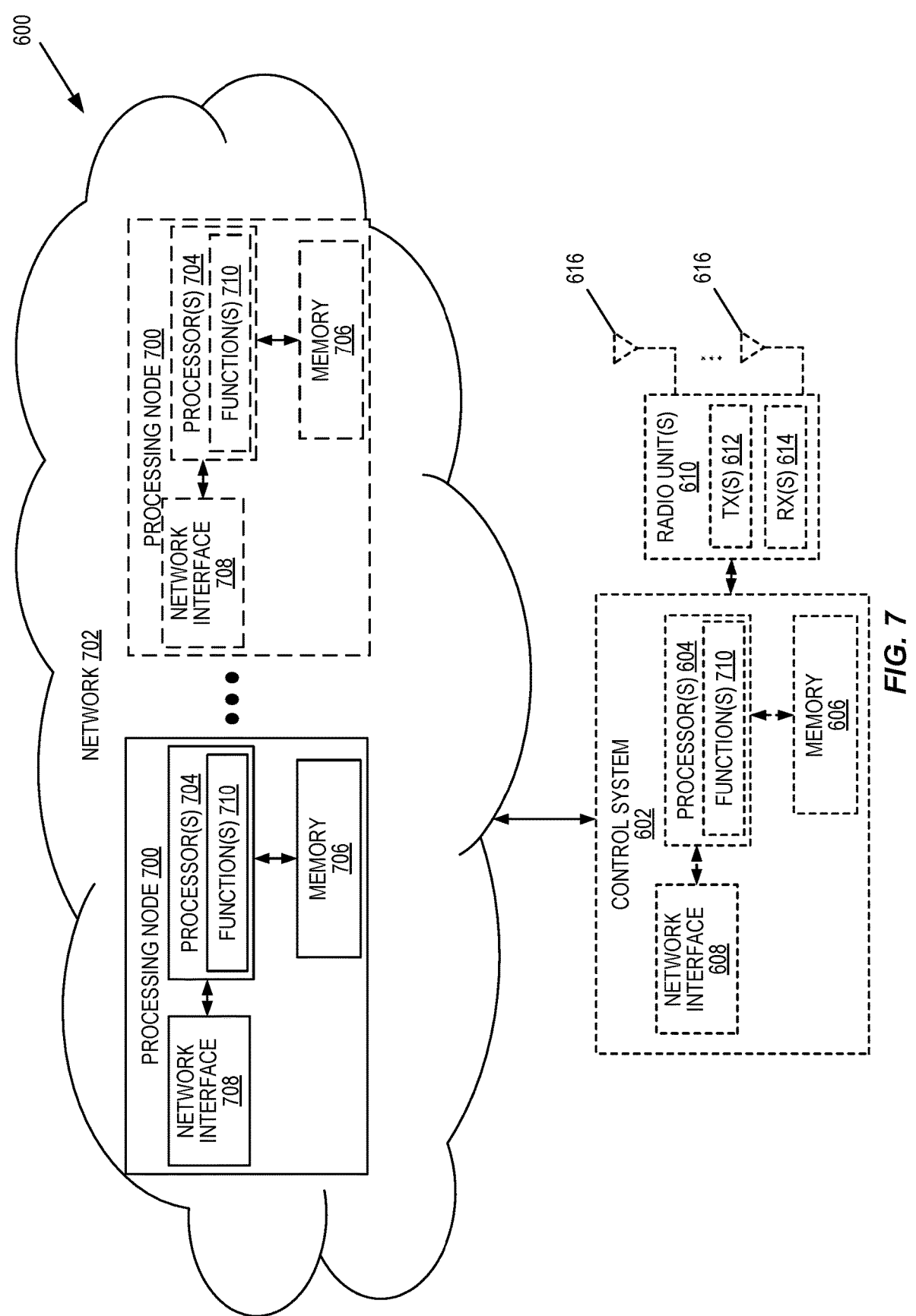
FIG. 7 is a schematic block diagram of the radio access node of FIG. 6 according to some other embodiments disclosed herein.

FIG. 7 is a schematic block diagram that illustrates a virtualized embodiment of the radio access node 600 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 600 in which at least a portion of the functionality of the radio access node 600 is implemented as a virtual component(s) (e.g., via a virtual machine(s) executing on a physical processing node (s) in a network(s)). As illustrated, in this example, the radio access node 600 may include the control system 602 and/or the one or more radio units 610, as described above. The control system 602 may be connected to the radio unit(s) 610 via, for example, an optical cable or the like. The radio access node 600 includes one or more processing nodes 700 coupled to or included as part of a network(s) 702. If present, the control system 602 or the radio unit(s) are connected to the processing node(s) 700 via the network 702. Each processing node 700 includes one or more processors 704 (e.g., CPUs, ASICs, FPGAs, and/or the like), memory 706, and a network interface 708.

In this example, functions 710 of the radio access node 600 described herein are implemented at the one or more processing nodes 700 or distributed across the one or more processing nodes 700 and the control system 602 and/or the radio unit(s) 610 in any desired manner. In some particular embodiments, some or all of the functions 710 of the radio access node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of radio access node 600 or a node (e.g., a processing node 700) implementing one or more of the functions 710 of the radio access node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
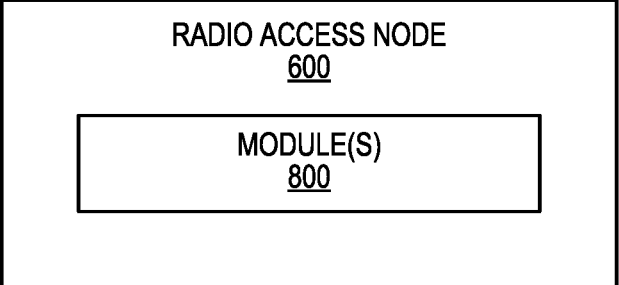
FIG. 8 is a schematic block diagram that illustrates a virtualized embodiment of the radio access node of FIG. 6 according to some embodiments disclosed herein.

FIG. 8 is a schematic block diagram of the radio access node 600 according to some other embodiments of the present disclosure. The radio access node 600 includes one or more modules 800, each of which is implemented in software. The module(s) 800 provide the functionality of the radio access node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
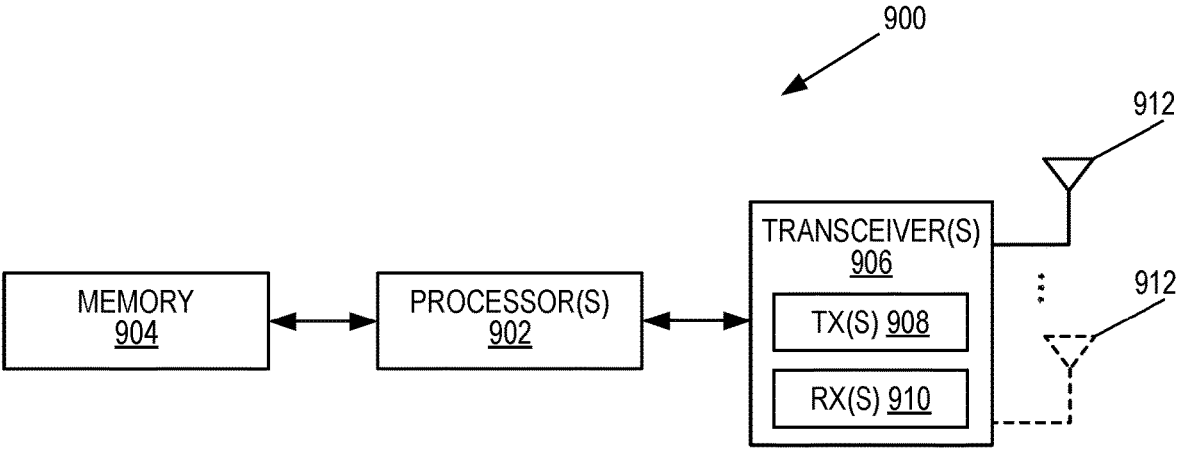
FIG. 9 is a schematic block diagram of a User Equipment (UE) according to some embodiments disclosed herein.

FIG. 9 is a schematic block diagram of a wireless communication device 900 according to some embodiments of the present disclosure. As illustrated, the wireless communication device 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the wireless communication device 900 described above may be fully or partially implemented in software that is, e.g., stored in the memory 904 and executed by the processor(s) 902. Note that the wireless communication device 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the wireless communication device 900 and/or allowing output of information from the wireless communication device 900), a power supply (e.g., a battery and associated power circuitry), etc.

In some embodiments, a computer program including instructions which, when executed by at least one processor, causes the at least one processor to carry out the functionality of the wireless communication device 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
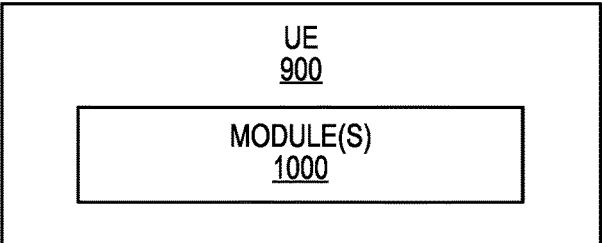
FIG. 10 is a schematic block diagram of the UE of FIG. 9 according to some other embodiments disclosed herein.

FIG. 10 is a schematic block diagram of the wireless communication device 900 according to some other embodiments of the present disclosure. The wireless communication device 900 includes one or more modules 1000, each of which is implemented in software. The module(s) 1000 provide the functionality of the wireless communication device 900 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed in a network node of a Next Generation Radio Access Network (NG-RAN) of a cellular communication system to enable rejection and retry of registration, the method comprising:

determining that a Single-Network Slice Selection Assistance Information (S-NSSAI) requested by a User Equipment (UE) cannot be served by an original serving cell or cannot be served at a serving Radio Access Network (RAN);

determining that the S-NSSAI requested by the UE can be served by a target cell in range;

performing release with redirection (RwR) or radio resource control (RRC) reconfiguration to redirect the UE to the target cell; and transmitting, to the UE, a registration reattempt indication to instruct the UE to reattempt registration including the S-NSSAI.

Embodiment 2: The method of embodiment 1, wherein the registration reattempt indication comprises the S-NSSAI causing redirection.

Embodiment 3: The method of embodiment 1, wherein the registration reattempt indication comprises a list of S-NSSAIs that the UE can use in the target cell as requested Network Slice Selection Assistance Information (NSSAI).

Embodiment 4: The method of embodiment 1, further comprising receiving the S-NSSAI from the UE in an RRC Setup Complete message or an RRC Resume Complete message.

Embodiment 5: The method of embodiment 1, further comprising receiving the S-NSSAI from an Access and Mobility Management Function (AMF) of the NG-RAN.

Embodiment 6: A network node of a Next Generation Radio Access Network (NG-RAN) of a cellular communication system to enable rejection and retry of registration, the network node comprising:

a network interface; and processing circuitry associated with the network interface, the processing circuitry configured to cause the network node to:

determine that a Single-Network Slice Selection Assistance Information (S-NSSAI) requested by a User Equipment (UE) cannot be served by an original serving cell or cannot be served at a serving Radio Access Network (RAN);

determine that the S-NSSAI requested by the UE can be served by a target cell in range;

perform release with redirection (RwR) or radio resource control (RRC) reconfiguration to redirect the UE to the target cell; and transmit, to the UE, a registration reattempt indication to instruct the UE to reattempt registration including the S-NSSAI.

Embodiment 7: The network node of embodiment 6, wherein the registration reattempt indication comprises the S-NSSAI causing redirection.

Embodiment 8: The network node of embodiment 6, wherein the registration reattempt indication comprises a list of S-NSSAIs that the UE can use in the target cell as requested Network Slice Selection Assistance Information (NSSAI).

Embodiment 9: The network node of embodiment 6, wherein the processing circuitry is further configured to cause the network node to receive the S-NSSAI from the UE in an RRC Setup Complete message or an RRC Resume Complete message.

Embodiment 10: The network node of embodiment 6, wherein the processing circuitry is further configured to cause the network node to receive the S-NSSAI from an Access and Mobility Management Function (AMF) of the NG-RAN.

Embodiment 11: A method performed in a User Equipment (UE) of a Next Generation Radio Access Network (NG-RAN) of a cellular communication system to enable rejection and retry of registration, the method comprising:

receiving a registration reattempt indication to instruct the UE to reattempt registration including a Single-Network Slice Selection Assistance Information (S-NSSAI) that caused a redirection from an original serving cell to a target cell; and attempting to establish a radio resource control (RRC) connection with the target cell.

Embodiment 12: The method of embodiment 11, further comprising, responsive to a successful attempt to establish the RRC connection with the target cell:

determining, by the UE based on the registration reattempt indication, to resend the S-NSSAI; and sending the S-NSSAI to a network node of the target cell.

Embodiment 13: The method of embodiment 12, wherein sending the S-NSSAI to the network node of the target cell comprises sending the S-NSSAI as a requested Network Slice Selection Assistance Information (NSSAI).

Embodiment 14: The method of embodiment 11, further comprising, responsive to an unsuccessful attempt to establish the RRC connection with the target cell, determining, by the UE based on the Registration reattempt indication, whether to reconnect to the original serving cell or to any cell in range with a same Tracking Area Identity (TAI) as the original serving cell.

Embodiment 15: A User Equipment (UE) of a Next Generation Radio Access Network (NG-RAN) of a cellular communication system to enable rejection and retry of registration, comprising:

one or more transmitters;

one or more receivers; and processing circuitry associated with the one or more transmitters and the one or more receivers, the processing circuitry configured to cause the UE to:

receive a registration reattempt indication to instruct the UE to reattempt registration including a Single-Network Slice Selection Assistance Information (S-NSSAI) that caused a redirection from an original serving cell to a target cell;

attempt to establish a radio resource control (RRC) connection with the target cell;

responsive to the attempt to establish the RRC connection with the target cell being successful:

determine, based on the registration reattempt indication, to resend the S-NSSAI; and send the S-NSSAI to a network node of the target cell; and responsive to the attempt to establish the RRC connection with the target cell being unsuccessful, determine, based on the registration reattempt indication, whether to reconnect to the original serving cell or to any cell in range with a same Tracking Area Identity (TAI) as the original serving cell.

Embodiment 16: The UE of embodiment 15, wherein the processing circuitry is further configured to cause the UE to send the S-NSSAI to the network node of the target cell by being configured to send the S-NSSAI as a requested Network Slice Selection Assistance Information (NSSAI).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
AS Access Stratum
ASIC Application Specific Integrated Circuit
AUSF Authentication Server Function
CN Core Network
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
HO Handover
IoT Internet of Things
IP Internet Protocol
LTE Long Term Evolution
MME Mobility Management Entity
MTC Machine Type Communication
NAS Non-Access Stratum
NEF Network Exposure Function
NF Network Function
NG-RAN Next Generation Radio Access Network
NR New Radio
NRF Network Function Repository Function
NSSAI Network Slice Selection Assistance Information
NSSF Network Slice Selection Function
OTT Over-the-Top
PC Personal Computer
PCF Policy Control Function
P-GW Packet Data Network Gateway
QoS Quality of Service
RA Registration Area
RAM Random Access Memory
RAN Radio Access Network
ROM Read Only Memory
RRC Radio Resource Control
RRH Remote Radio Head
RTT Round Trip Time
RwR Release with Redirection
SCEF Service Capability Exposure Function
SMF Session Management Function
S-NSSAI Single-Network Slice Selection Assistance Information
TA Tracking Area
TAI Tracking Area Identity
TR Technical Report
UDM Unified Data Management
UE User Equipment
UPF User Plane Function
Those skilled in the art will recognize improvements and modifications to the embodiments of the present disclosure.

All such improvements and modifications are considered within the scope of the concepts disclosed herein.

The invention claimed is:

1. A method performed in a User Equipment, UE, of a Next Generation Radio Access Network, NG-RAN, of a cellular communication system to enable redirection and retry of registration, the method comprising:

transmitting a Non-Access Stratum, NAS, registration request comprising one or more Single-Network Slice Selection Assistance Information, S-NSSAI, indicated as one or more requested S-NSSAI;

receiving, in an Access Stratum, AS, protocol, an AS-level registration reattempt indication to instruct the UE to reattempt the NAS registration request in a target cell;

reattempting the NAS registration in the target cell, responsive to receiving the AS-level registration reattempt indication, wherein reattempting the NAS registration in the target cell comprises attempting to establish an AS connection in the target cell; and responsive to successfully attempting to establish the AS connection in the target cell:

determining, by the UE based on the AS-level registration reattempt indication, to request a NAS registration requesting the one or more S-NSSAI; and sending, to an access node, another NAS registration request containing the one or more S-NSSAI.

2. The method of claim 1, wherein the AS protocol comprises a Radio Resource Control, RRC, protocol.

3. The method of claim 1, further comprising receiving a release with redirection, RwR, or RRC reconfiguration to redirect the UE to the target cell.

4. The method of claim 1, further comprising receiving, by the UE, a NAS registration accept message.

5. The method of claim 1, wherein the AS-level registration reattempt indication includes at least one S-NSSAI of the one or more S-NSSAI that caused a redirection from an original serving cell.

6. A User Equipment, UE, of a Next Generation Radio Access Network, NG-RAN, of a cellular communication system to enable redirection and retry of registration, comprising:

one or more transmitters;

one or more receivers; and processing circuitry associated with the one or more transmitters and the one or more receivers, the processing circuitry configured to cause the UE to:

transmit a Non-Access Stratum, NAS, registration request comprising one or more Single-Network Slice Selection Assistance Information, S-NSSAI, indicated as one or more requested S-NSSAI;

receive, in an Access Stratum, AS, protocol, an AS-level registration reattempt indication to instruct the UE to reattempt the NAS registration request in a target cell;

reattempt the NAS registration in the target cell, responsive to receiving the AS-level registration reattempt indication, wherein reattempting the NAS registration in the target cell comprises attempting to establish an AS connection in the target cell; and responsive to successfully attempting to establish the AS connection in the target cell:

determine, by the UE based on the AS-level registration reattempt indication, to request a NAS registration requesting the one or more S-NSSAI; and send, to an access node, another NAS registration request containing the one or more S-NSSAI.

7. A method performed in a User Equipment, UE, of a Next Generation Radio Access Network, NG-RAN, of a cellular communication system to enable redirection and retry of registration, the method comprising:

transmitting a Non-Access Stratum, NAS, registration request comprising one or more Single-Network Slice Selection Assistance Information, S-NSSAI, indicated as one or more requested S-NSSAI;

receiving, in an Access Stratum, AS, protocol, an AS-level registration reattempt indication to instruct the UE to reattempt the NAS registration request in a target cell;

reattempting the NAS registration in the target cell, responsive to receiving the AS-level registration reattempt indication, wherein reattempting the NAS registration in the target cell comprises attempting to establish an AS connection in the target cell; and responsive to unsuccessfully attempting to establish the AS connection in the target cell, determining, by the UE based on the AS-level registration reattempt indication, whether to reconnect to the original serving cell or to any cell in range with a same Tracking Area Identity, TAI, as the original serving cell.

\* \* \* \* \*